(12) United States Patent
Aoki (10) Patent No.: US 9,841,896 B2
(45) Date of Patent: Dec. 12, 2017

(54) MOBILE TERMINAL TEST DEVICE

(71) Applicant: ANRITSU CORPORATION, Kanagawa (JP)

(72) Inventor: Kazunori Aoki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 197 days.

(21) Appl. No.: 14/847,080

(22) Filed: Sep. 8, 2015

(65) Prior Publication Data

US 2016/0084875 A1 Mar. 24, 2016

(30) Foreign Application Priority Data

Sep. 24, 2014 (JP) ................. 2014-193791

(51) Int. Cl.
- *G01R 1/02* (2006.01)
- *G06F 3/0488* (2013.01)
- *G06F 3/0484* (2013.01)
- *G01R 31/28* (2006.01)
- *H04M 1/24* (2006.01)

(52) U.S. Cl.
CPC ...... *G06F 3/04886* (2013.01); *G06F 3/04847* (2013.01); *H04M 1/24* (2013.01); *G06F 2203/04803* (2013.01); *H04M 2250/22* (2013.01)

(58) Field of Classification Search
CPC .. G06F 3/04883; G06F 3/0481; G06F 3/0482; G06F 3/0488; G06F 3/04886; G06F 3/04842; G06F 3/03547; G06F 3/038; G06F 3/0412

USPC .................................................. 345/173, 174
See application file for complete search history.

(56) References Cited

U.S. PATENT DOCUMENTS

| | | | | |
|---|---|---|---|---|
| 2012/0226459 | A1* | 9/2012 | Komatsu | G01N 27/4163 702/85 |
| 2013/0096575 | A1* | 4/2013 | Olson | G06T 19/003 606/130 |
| 2015/0297282 | A1* | 10/2015 | Cadouri | A61B 18/1206 606/34 |
| 2015/0367136 | A1* | 12/2015 | Rondoni | A61N 1/37217 607/42 |

FOREIGN PATENT DOCUMENTS

| | | |
|---|---|---|
| JP | H03-291524 A | 12/1991 |
| JP | 2014-072838 A | 4/2014 |

\* cited by examiner

*Primary Examiner* — Jonathan Han (74) *Attorney, Agent, or Firm* — Pearne & Gordon LLP (57) ABSTRACT

A plurality of touch operation areas which are allocated to a plurality of measurement items for a mobile terminal are set in a touch-panel-type operating unit 40. A list of sections of the touch operation areas and a list of measurement item names for each section are displayed on a screen of a display unit 30. A switching button for switching the measurement item which has been invalidated among the measurement items to a valid state is displayed to inform an operator that the measurement item has been invalidated. The measurement results of the measurement item which has been validated are displayed in the sections to inform the operator that the measurement item has been validated.

6 Claims, 8 Drawing Sheets

| Signalng Trace | | | |
|---|---|---|---|
| U-S | Message | Description | Time at RRC |
| → | M(1) | D(1) | T(1) |
| ← | M(2) | D(2) | T(2) |
| → | M(3) | D(3) | T(3) |
| -- | ----- | ----- | ----- |
| → | M(n-1) | D(n-1) | T(n-1) |
| ← | M(n) | D(n) | T(n) |
| → | M(n+1) | D(n+1) | T(n+1) |
| -- | ----- | ----- | ----- |
| → | M(m-3) | D(m-3) | T(m-3) |
| ← | M(m-2) | D(m-2) | T(m-2) |
| → | M(m-1) | D(m-1) | T(m-1) |
| ← | M(m) | D(m) | T(m) |

FIG. 8

MOBILE TERMINAL TEST DEVICE

TECHNICAL FIELD

The present invention relates to a test device which tests a mobile terminal, such as a mobile phone or a smart phone, and more particularly, to a technique which enables an operator to intuitively recognize a list of measurement items that can be designated for a mobile terminal to be tested and the measurement item that is designated in the list by the operator when a so-called touch-panel-type operating unit that has a transparent operation panel superimposed on a screen of a display and can be operated by the touch of the operator on, for example, a button or a character displayed on the screen is used, and can improve ease of operation.

BACKGROUND ART

In recent years, the processing speed and functionality of a mobile terminal have been improved and the number of measurement items for testing a terminal has significantly increased.

For example, measurement items for signals transmitted from an LTE terminal include an occupied bandwidth, a spectrum emission mask, an adjacent channel leakage power rate, in-band emission, spectrum flatness, a modulation error vector magnitude, a modulation phase error, a modulation magnitude error, and constellation. In addition, there is a measurement item (generally referred to as a signaling test) for measuring whether messages are correctly transmitted and received between the terminal and the test device.

The measurement items include measurement items unique to systems other than the LTE system. It is necessary to set parameters for each measurement item. It is very difficult to perform various setting operations using a knob or a push button which is provided on an operation panel with a limited area.

As a technique for solving the above-mentioned problem, a measurement device or a communication device has been developed which uses a touch panel in which a display unit and an operating unit are integrated with each other (for example, Patent Document 1). As a parameter setting process, for example, the following technique disclosed in Patent Document 2 has been put into practical use: a list of setting items which the user wants to set is vertically displayed on a display surface of the measurement device or the communication device; a mark which is operated to set parameters is displayed next to each setting item in the horizontal direction; and the user touches the mark which is displayed next to a desired setting item to set parameters for the item.

RELATED ART DOCUMENT

Patent Document

[Patent Document 1] JP-A-3-291524
[Patent Document 2] JP-A-2014-72838

DISCLOSURE OF THE INVENTION

Problem that the Invention is to Solve

In a setting method using the touch panel, when the above-mentioned measurement items are designated, it is generally considered that a list of the names of the measurement items which can be designated is displayed and the user touches a desired measurement item among the displayed measurement item names.

In this case, for example, the following method is considered: words, such as "ON" and "OFF", are displayed next to the measurement item names in order to distinguish a designated item from a non-designated item. However, in the identification method using letters, it is difficult to check the currently designated measurement items among many measurement items.

Devices according to the related art have a function of independently displaying the measurement results of each measurement item on a display unit, but do not have a function of displaying all of the measurement results of a plurality of measurement items on one screen, which makes it difficult to check all of the measurement results of the currently designated measurement items.

The invention has been made in order to solve the above-mentioned problems and an object of the invention is to provide a mobile terminal test device which enables a user to check which of a plurality of measurement items for a terminal are designated and how all of the measurement results of the designated measurement items are obtained on one screen.

Means for Solving the Problem

In order to achieve the object, according to a first aspect of the invention, there is provided a mobile terminal test device including: a measurement unit that transmits and receives signals to and from a mobile terminal to be tested and measures a designated measurement item; a display unit; an operating unit that is used to designate the measurement item to be measured by the measurement unit; and a control unit that instructs the measurement unit to measure the measurement item designated by the operating unit and displays measurement results of the designated measurement item on the display unit. The operating unit includes a touch-panel-type operating unit that is overlapped on a screen of the display unit. The control unit includes: measurement item list display means for setting a plurality of touch operation areas allocated to a plurality of measurement items for the mobile terminal to be tested, which can be measured by the measurement unit, in the touch-panel-type operating unit and displaying a list of sections indicating the outer edges of the plurality of touch operation areas and measurement item names for the sections on the display unit; validation/invalidation designation means for designating whether to validate or invalidate the execution of the measurement item whose name is displayed; switching button display means for displaying, in the section of the touch operation area corresponding to the measurement item which has been invalidated by the validation/invalidation designation means, a switching button for switching the designated state of the measurement item from an invalid state to a valid state to inform that the measurement item has been invalidated; and in-section measurement result display means for displaying the measurement results of the measurement item which has been validated by the validation/invalidation designation means and the measurement item whose designated state has been changed from the invalid state to the valid state by a touch operation for the switching button displayed by the switching button display means in the sections of the touch operation areas corresponding to the measurement items to inform that the measurement item has been validated.

According to a second aspect of the invention, the mobile terminal test device according to the first aspect may further include measurement result enlargement and display means for, when the section of the touch operation area in which the measurement results are displayed by the in-section measurement result display means is touched, enlarging and displaying the measurement results, instead of the display of the list by the measurement item list display means.

According to a third aspect of the invention, in the mobile terminal test device according to the first aspect, the measurement item list display means may have a first mode in which a list of measurement items related to the quality of a transmission signal from the mobile terminal is displayed and a second mode in which a list of measurement items related to a message that is transmitted and received to and from the mobile terminal is displayed. The in-section measurement result display means may display the measurement results of any of the measurement items, which are displayed as a list in the first mode and the second mode, in each section. The measurement result enlargement and display means may enlarge and display the measurement results, instead of the display of the list.

According to a fourth aspect of the invention, in the mobile terminal test device according to the first aspect, the display of the list of the measurement items may be a tile display in which the measurement items are arranged in a vertical direction and a horizontal direction.

According to a fifth aspect of the invention, in the mobile terminal test device according to the first aspect, the switching button may have a word "ON" displayed thereon and may be displayed substantially at the center of the section.

According to a sixth aspect of the invention, in the mobile terminal test device according to the first aspect, the control unit may display a start button in a portion of a display screen of the measurement results which are enlarged and displayed by the measurement result enlargement and display means. When the start button is touched, the control unit may instruct the measurement unit to measure the measurement item which is validated at the present time and may update the display on the basis of the measurement results obtained by the measurement unit.

Advantages of the Invention

According to the above-mentioned structure, in the mobile terminal test device according to the invention, a plurality of touch operation areas allocated to a plurality of measurement items which can be measured for the mobile terminal to be tested are set in the touch-panel-type operating unit and a list of the sections of the plurality of touch operation areas and the measurement item names for the sections are displayed on the screen of the display unit. The switching button for switching the measurement item which has been invalidated among the measurement items to a valid state is displayed to inform the operator that the measurement item has been invalidated. The measurement results of the measurement item which has been validated are displayed in the section to inform the operator that the measurement item has been validated.

In addition, when the section in which the measurement results are displayed is touched, the measurement results are enlarged and displayed.

Therefore, the operator can intuitively recognize which of a plurality of measurement items for a terminal is designated and how all of the measurement results of the designated measurement items are obtained on one screen. In addition, the measurement results of a non-designated measurement item are not displayed in the section and the switching button is displayed in the section corresponding to the non-designated measurement item. Therefore, the operator can intuitively designate an additional measurement item.

When any of a list of the measurement results of the measurement items related to the quality of the transmission signal from the mobile terminal and a list of the measurement results of the measurement items related to the messages which are transmitted and received to and from the mobile terminal is touched, the measurement results are enlarged and displayed. Therefore, user convenience is improved.

In the sixth aspect of the invention, remeasurement can be performed, without moving a measurement result enlargement display screen to another screen. Therefore, it is possible to improve operation efficiency.

BEST MODE FOR CARRYING OUT THE INVENTION

Hereinafter, embodiments of the invention will be described with reference to the drawings.

Figure 1:
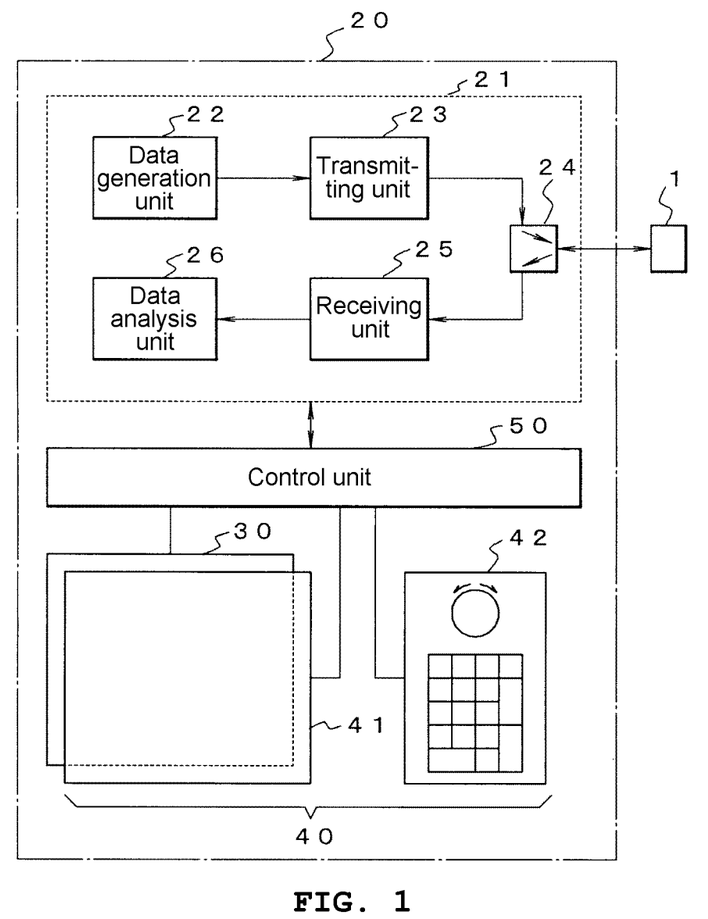
FIG. 1 is a diagram illustrating the structure of an embodiment of the invention.

FIG. 1 illustrates the structure of a mobile terminal test device 20 according to the invention.

The mobile terminal test device 20 includes a measurement unit 21, a display unit 30, an operating unit 40, and a control unit 50.

The measurement unit 21 has the function of a pseudo base station apparatus which simulates a base station and communicates with a mobile terminal 1 and includes a data generation unit 22, a transmitting unit 23, a coupler 24, a receiving unit 25, and a data analysis unit 26.

The data generation unit 22 generates a baseband signal including various messages required for a test and link connection (call connection) to the mobile terminal 1 and transmits the baseband signal to the transmitting unit 23. The transmitting unit 23 modulates the input baseband signal using a predetermined modulation method, converts the modulated signal into a signal in a frequency band for communication with the mobile terminal 1, and transmits the converted signal to the mobile terminal 1 through the coupler 24.

The receiving unit 25 receives a signal transmitted from the mobile terminal 1 through the coupler 24, performs a frequency conversion process, which is the inversion of the frequency conversion process of the transmitting unit 23, and a process of demodulating the signal into a baseband signal, and transmits the obtained baseband signal to the data analysis unit 26.

The data analysis unit 26 analyzes the obtained baseband signal according to measurement items which are designated in advance.

For example, when the communication system is an LTE system and the designated measurement item is an occupied bandwidth, the data analysis unit 26 performs a spectrum analysis process (fast Fourier transform process) for the obtained baseband signal to calculate the spectrum waveform of the baseband signal and calculates the value of the occupied bandwidth.

When the designated measurement item is a spectrum emission mask, similarly, the data analysis unit 26 performs the spectrum analysis process to calculate the spectrum waveform of the baseband signal and determines whether the spectrum waveform is in the range of a predetermined spectrum mask.

When the designated measurement item is adjacent channel leakage power rate, the data analysis unit 26 extends the range of the spectrum analysis process to an adjacent channel, calculates the spectrum waveform of the adjacent channel, and calculates the value of leakage power to the adjacent channel.

When the designated measurement item is in-band emission, the data analysis unit 26 calculates a spectrum using the same method as described above and calculates the value of total power in the band.

When the designated measurement item is spectrum flatness, the data analysis unit 26 calculates a spectrum waveform using the same method as described above and calculates the value of the spectrum flatness in the band.

When an error vector magnitude, a phase error, a magnitude error, and constellation are designated as the measurement items related to modulation quality, the data analysis unit 26 calculates a vector magnitude error, a phase error, and a magnitude error for a reference symbol point which is obtained on the basis of a modulation method.

When a signaling test is designated in addition to the measurement items related to the quality of the transmission signal from the mobile terminal 1 to be measured, the data analysis unit 26 stores various messages which are transmitted and received to and from the mobile terminal 1.

The control unit 50 designates the measurement items which are performed for the mobile terminal 1 by the measurement unit 21 on the basis of the operation of the operating unit 40 and displays the measurement results obtained by the measurement unit 21 on the display unit 30.

The display unit 30 is, for example, a liquid crystal display panel having a predetermined number of pixels. The operating unit 40 includes a first touch-panel-type operating unit 41 which is overlapped on a screen of the display unit 30 and a second operating unit 42 which includes, for example, a numeric keypad for inputting numerical values and a rotary encoder for changing numerical values and requires a mechanical operation, such as a key pressing operation or a knob rotating operation.

The first operating unit 41 includes transparent electrodes (not illustrated) which are used to detect the touch of, for example, a finger of a person and are arranged at a very small pitch (an electrostatic type or a piezoelectric type) and outputs information (touch position information) for specifying a touch position to the control unit 50. The control unit 50 determines which of predetermined touch operation areas the touch position information belongs to and performs a necessary processing for the item allocated to the touch operation area.

In this embodiment, for example, the numeric keypad or the rotary encoder is included in the second operating unit 42 which is mechanically operated. However, the following structure may be used: an image of a numeric keypad or a rotary encoder is displayed on the screen of the display unit 30; the touch operation area is set at the position of the first operating unit 41 corresponding to the numeric keypad or the rotary encoder; and, when the touch operation area is touched, a numerical value is input or changed.

The control unit 50 performs, for example, a process of setting various parameters required to test the mobile terminal 1 or a process of designating the measurement items, on the basis of an operation through the operating unit 40, and performs control related to the display of the measurement results obtained by the measurement unit 21.

Figure 2:
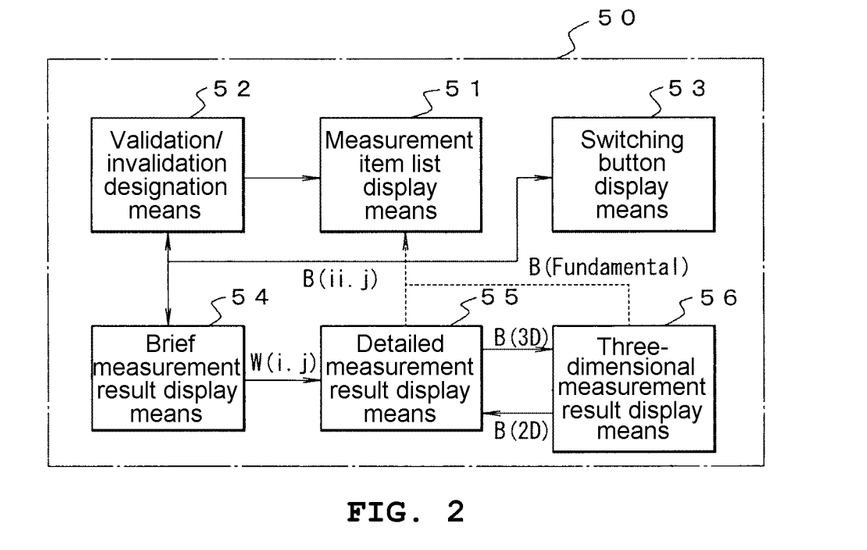
FIG. 2 is a functional block diagram illustrating a main portion according to the embodiment.

The control unit 50 performs various processes. However, in this embodiment, only the process related to the designation of the measurement items or the display of the measurement results will be described. FIG. 2 illustrates the structure of a functional block which performs the process related to the designation of the measurement items and the display of the measurement results.

In FIG. 2, measurement item list display means 51 sets, in the first touch-panel-type operating unit 41, a plurality of touch operation areas allocated to a plurality of measurement items which can be performed by the measurement unit 21 for the mobile terminal 1 to be tested and displays a section of each of the plurality of touch operation areas and a measurement item name for each section on the screen of the display unit 30.

Figure 3:
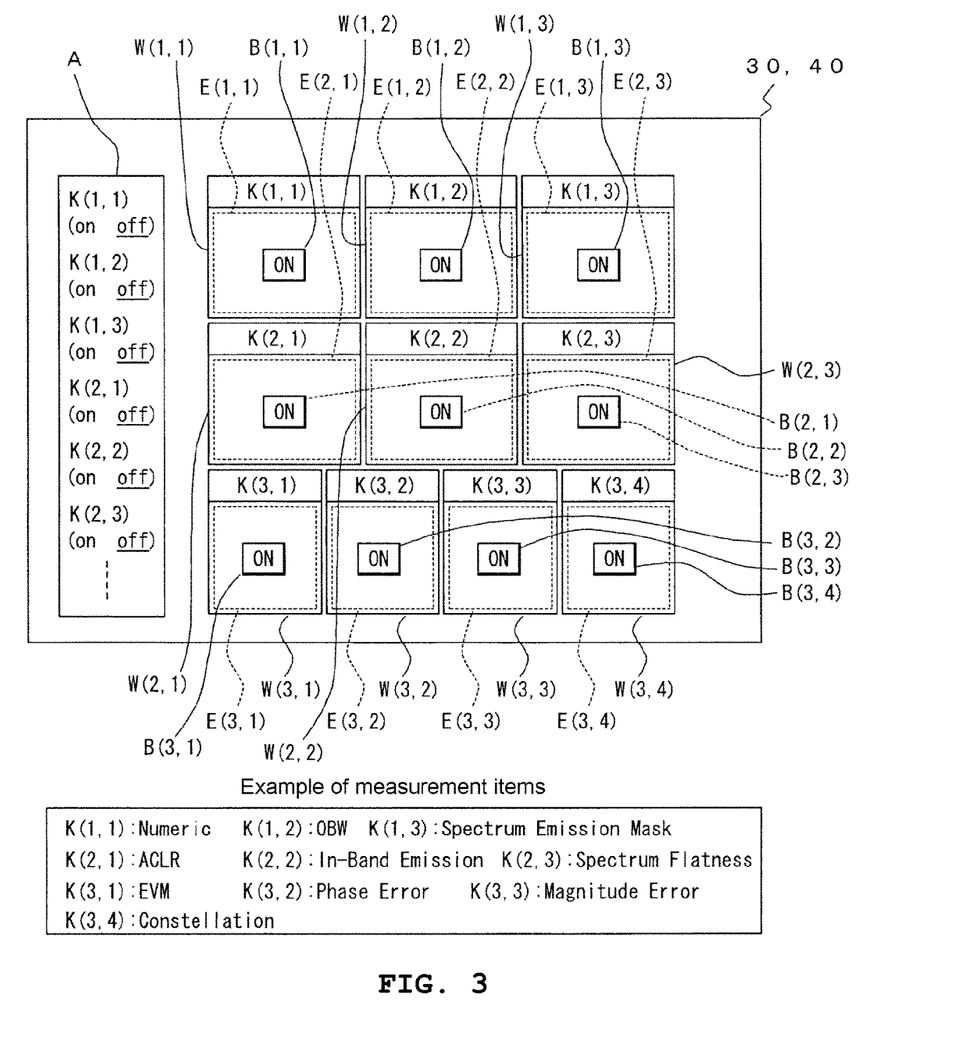
FIG. 3 is a diagram illustrating an example of an initial screen of a measurement item list.

FIG. 3 illustrates an example of the display. The measurement item list display means 51 sets 10 touch operation areas E(1,1) to E(3,4) in the first operating unit 41 in the vertical and horizontal directions, displays frames W(1,1) to W(3,4) indicating sections, which are the outer edges of the touch operation areas, on the display unit 30, and displays item names K(1,1) to K(3,4) at the upper edges of the frames (a method which displays the divided areas that are determined in this way in the horizontal and vertical directions is referred to as tile display).

The measurement item names related to the quality of the transmission signal from an LTE mobile terminal will be described in detail as follows. The item name K(1,1) is "Numeric" indicating the numerical results of each measurement item, the item name K(1,2) is "OBW" indicating an occupied bandwidth. The item name K(1,3) is "Spectrum Emission Mask) indicating a spectrum emission mask. The item name K(2,1) is "ACLR" indicating adjacent channel leakage power rate. The item name K(2,2) is "In-Band Emission" indicating in-band emission. The item name K(2,3) is "Spectrum Flatness" indicating spectrum flatness. The item name K(3,1) is "EVM" indicating the error vector magnitude of the measurement item related to modulation quality. The item name K(3,2) is "Phase Error" indicating a phase error. The item name K(3,3) is "Magnitude Error" indicating a magnitude error. The item name K(3,4) is "Constellation" indicating the position of a symbol point.

Validation/invalidation designation means 52 is used to designate whether to validate or invalidate the execution of the item whose name has been displayed by the measurement item list display means 51. As represented by an area A in FIG. 3, the measurement item names, "ON" indicating validation, and "OFF" indicating invalidation are displayed on the left side of the item list in the vertical direction. The display ranges of "ON" and "OFF" are set in each of the touch operation areas (not illustrated).

Switching button display means 53 displays a switching button for switching the designated state of the measurement item from an invalid state to a valid state in the section of the touch operation area corresponding to the measurement item which has been invalidated by the validation/invalidation designation means 52 to inform that the measurement item has been invalidated.

In the example illustrated in FIG. 3, all of the measurement items are designated to be in an invalid state (initial state) and the switching buttons B(1,1) to B(3,4) indicating "ON" are displayed at the center of the touch operation areas corresponding to each measurement item. The display area and touch operation area of the switching button may be set to any range in the touch operation area of the measurement item or may be the same as the touch operation area of the measurement item.

Brief measurement result display means 54 displays the brief measurement results of the measurement item in the section of the touch operation area corresponding to the measurement item which has been validated by the validation/invalidation designation means 52 and the section of the touch operation area corresponding to the measurement item whose designated state has been changed from an invalid state to a valid state by a touch operation for the switching button displayed by the switching button display means 53 to inform that the measurement item has been validated. The brief measurement results are generated with a sufficient size which falls in the display range of each touch operation area, on the basis of the information obtained by the measurement unit 21.

Figure 4:
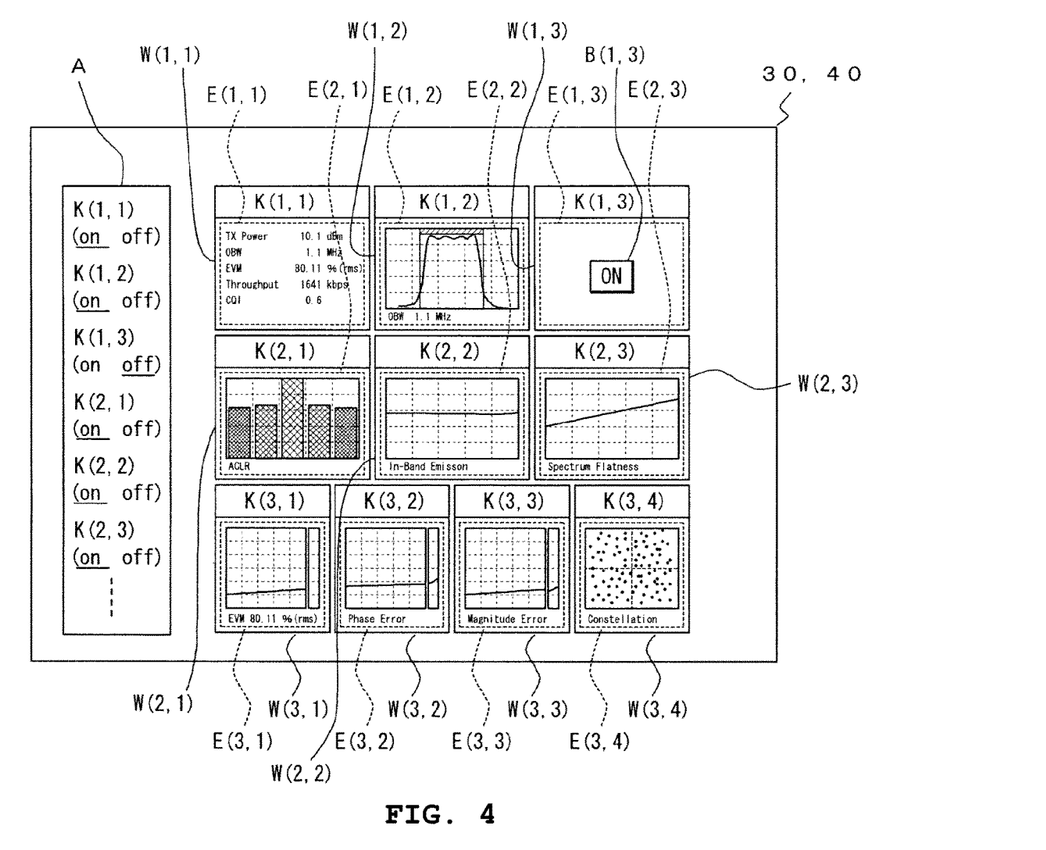
FIG. 4 is a diagram illustrating an example of a screen when a desired measurement item is validated.

For example, when the switching buttons of all of the measurement items except for the item K(1,3) are touched to validate the measurement items in the state illustrated in FIG. 3 and the measurement unit 21 is instructed to perform measurement, the brief measurement results of the designated measurement items are generated with a predetermined number of dots and are displayed, for example, as illustrated in FIG. 4.

Therefore, for example, as can been from the display of the measurement items in FIG. 4, it is possible to check at a glance that all of the measurement items except for the item K(1,3) are validated as the measurement items. The brief measurement result display means forms in-section measurement result display means according to the invention.

Detailed measurement result display means 55 generates display data for the detailed measurement results of an arbitrary measurement item touched by an operator among the touch operation areas in which the brief measurement results are displayed by the brief measurement result display means 54 and enlarges and displays the display data in a wide range of the screen, instead of displaying a list of the measurement items.

Figure 5:
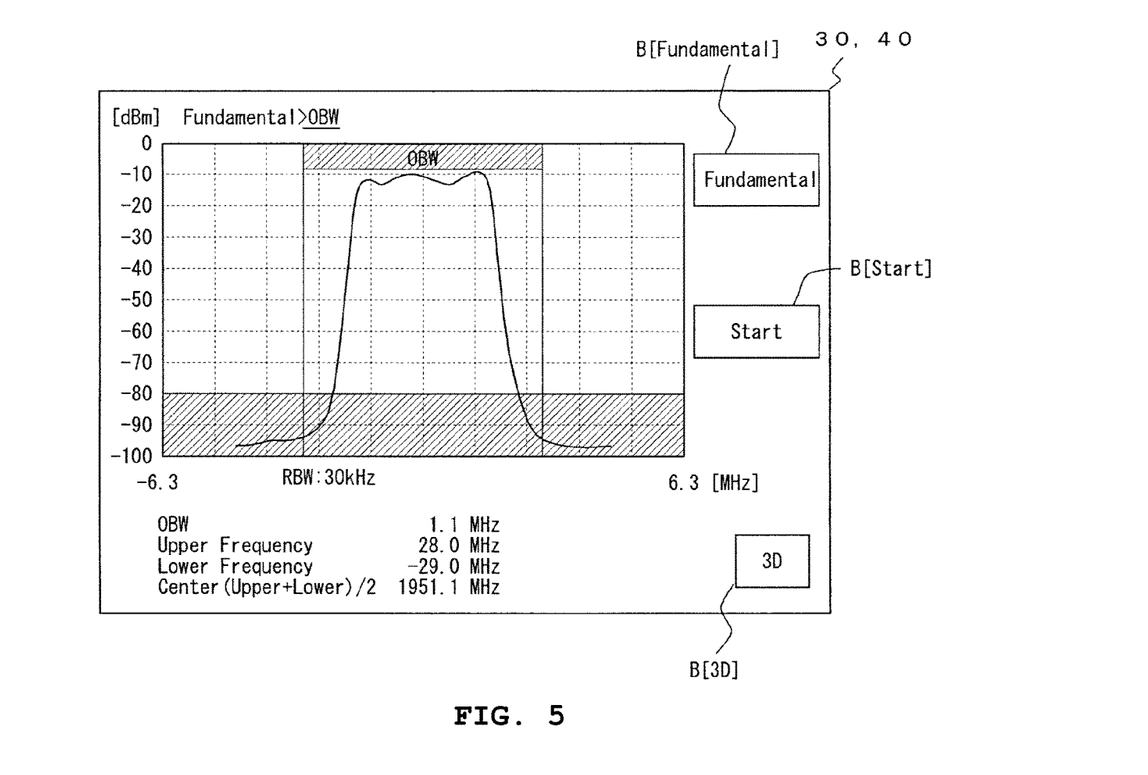
FIG. 5 is a diagram illustrating an example of the detailed measurement results displayed when the brief measurement results of the measurement item that has been validated are touched.

For example, when the item K(1,2) ("OBW") is touched in the state illustrated in FIG. 4, display data for the detailed measurement results of the occupied bandwidth including a two-dimensional graph having a frequency axis and a level axis and numerical results is generated, enlarged, and displayed, as illustrated in FIG. 5.

Then, the operator can immediately check the detailed measurement results of a desired measurement item among the measurement items which have been validated.

For items other than the item K(1,2), when the operator touches a portion in which the brief measurement results of the items are displayed, display data for the detailed measurement results of the items is generated. Then, the display data is enlarged and displayed on the screen of the display unit 30, instead of an item list display screen. The detailed measurement result display means forms measurement result enlargement and display means according to the invention.

In this embodiment, when the operation of designating the validation or invalidation of the measurement item is performed, the brief or detailed measurement results of the measured item are displayed. However, for example, as illustrated in FIG. 5, when a start button B(Start) is touched, the control unit 50 instructs the measurement unit 21 to measure the measurement items which have been validated at the present time and updates the display of the measurement items on the basis of the latest measurement results obtained by the measurement unit 21.

As illustrated in FIG. 5, a 3D button B(3D) indicating "3D" is displayed on a detailed measurement result display screen. When the 3D button B(3D) is touched, three-dimensional measurement result display means 56 which is provided in the control unit 50 illustrated in FIG. 2 generates display data for a three-dimensional (3D) graph which has an axis related to the elapse of time (for example, a time axis or an axis related to the number of measurements), in addition to the frequency axis and the level axis according to the related art, for the item whose measurement results are currently being displayed and displays the display data on the display unit 30, instead of displaying the two-dimensional graph.

Figure 6:
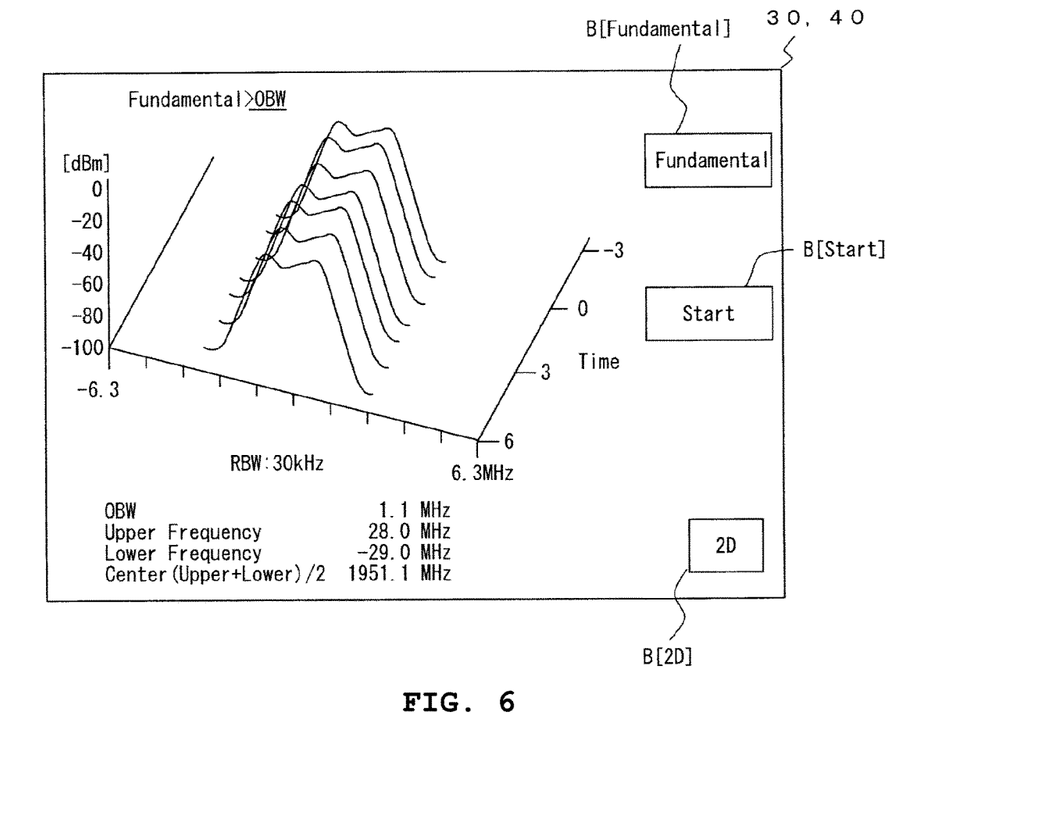
FIG. 6 is a diagram illustrating an example of three-dimensional measurement results displayed when a button 3D is touched on a detailed measurement result display screen.

FIG. 6 illustrates an example of the display of the display data. A three-dimensional graph which further includes the axis indicating the number of measurements and indicates the measurement results of the occupied bandwidth is displayed, instead of the two-dimensional detailed measurement results illustrated in FIG. 5. Therefore, it is possible to intuitively recognize a change in the characteristics of the measurement item "Occupied Bandwidth" over time. The three-dimensional measurement result display means 56 has a function of generating a three-dimensional graph, which further has an axis related to the elapse of time, for the measurement items having a two-dimensional graph as the measurement results, that is, the items K(1,2), K(1,3), K(2, 1), K(2,2), K(2,3), K(3,1), K(3,2), and K(3,3) other than K(1,1) indicating the numerical results and the item K(3,4) indicating constellation in the above-mentioned item example, among the above-mentioned measurement items, and of displaying the three-dimensional graph.

A "Fundamental" button B(Fundamental) which is illustrated on the right side of FIGS. 5 and 6 is used to return from the detailed measurement result display screen to the measurement item list screen (basic screen) illustrated in FIGS. 3 and 4. When the "Fundamental" button is touched in the state illustrated in FIG. 6, the screen returns to the measurement item list screen illustrated in FIG. 4.

As such, in the mobile terminal test device 20 according to the embodiment, the areas in which the brief measurement results of a plurality of measurement items are displayed operate as buttons for changing to a display screen for displaying the detailed measurement results of the items. When any of the buttons is touched, the detailed measurement results are displayed. The detailed measurement result display screen can be changed to a three-dimensional measurement result display screen by one touch. Therefore, convenience is significantly improved.

Figure 7:
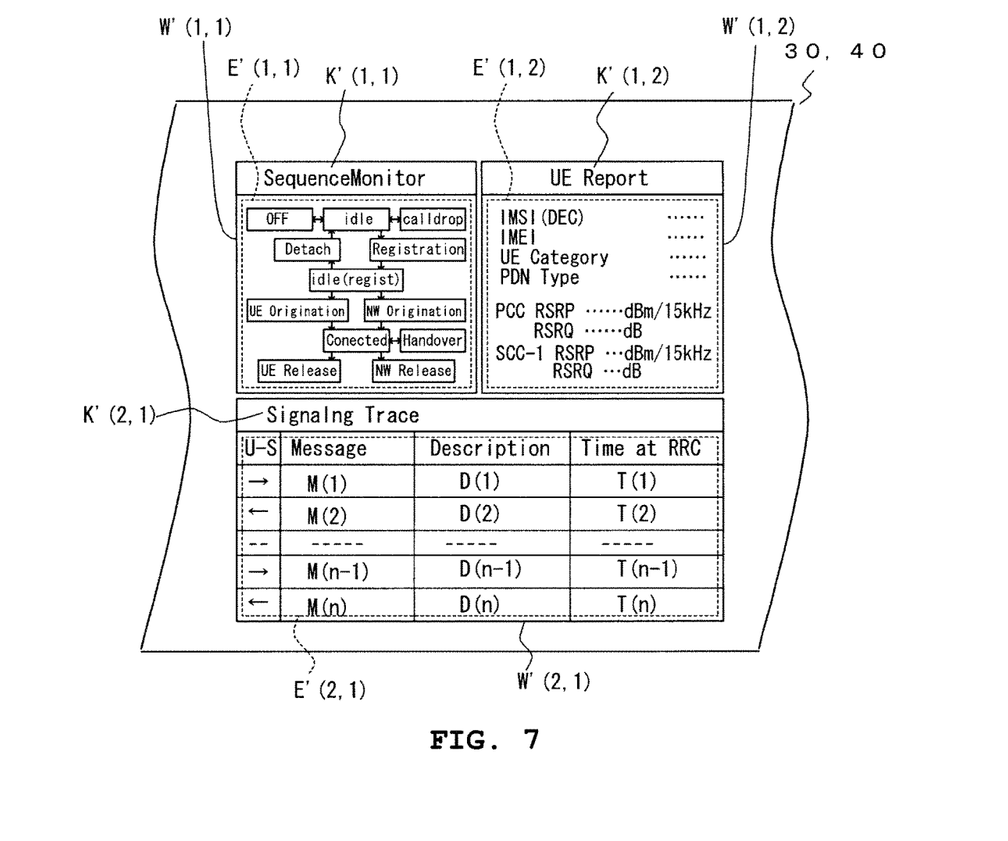
FIG. 7 is a diagram illustrating an example of the display of a list of measurement items related to a message which is transmitted and received to and from a mobile terminal.

The above-mentioned display example is focused on the measurement results of the signal quality of the mobile terminal. However, when a measurement mode (signaling test) related to the exchange of messages is designated, the measurement item list display means 51 sets two touch operation areas E'(1,1) and E'(1,2) and one touch operation area E'(2,1) at the upper end and the lower end, respectively, displays frames W'(1,1) to W'(2,1) indicating the sections of these operation areas on the display unit 30, and displays item names K'(1,1) to K'(2,1) at the upper edges of the frames, as illustrated in FIG. 7.

In this case, the detailed examples of the item names are as follows: K'(1,1) is an item name "Sequence Monitor" indicating a chart of sequence information related to the exchange of messages; K'(1,2) is an item name "UE Report" indicating various numerical values related to the messages from the terminal; and K'(2,1) is an item name "Signaling Trace" indicating the time-series arrangement of messages M which are exchanged between the test device and the mobile terminal, the description D of the messages, and a portion of message information (for example, only a predetermined number of initial information items) including a time T.

On the measurement item list screen for the signaling test, brief display data which is generated by the brief measurement result display means 54 on the basis of the measurement results obtained by the measurement unit 21 is displayed for each item. A switching button B(i,j) is displayed for the item which is designated to be invalidated by the validation/invalidation designation means 52. However, in the signaling test, indispensable items are excluded from the validation/invalidation designation target and no switching button is displayed for the indispensable items.

When the touch operation area of the item whose brief measurement results have been displayed is touched, the detailed measurement result display means 55 enlarges and displays the detailed measurement results of the item, instead of displaying the measurement item list screen.

Figure 8:
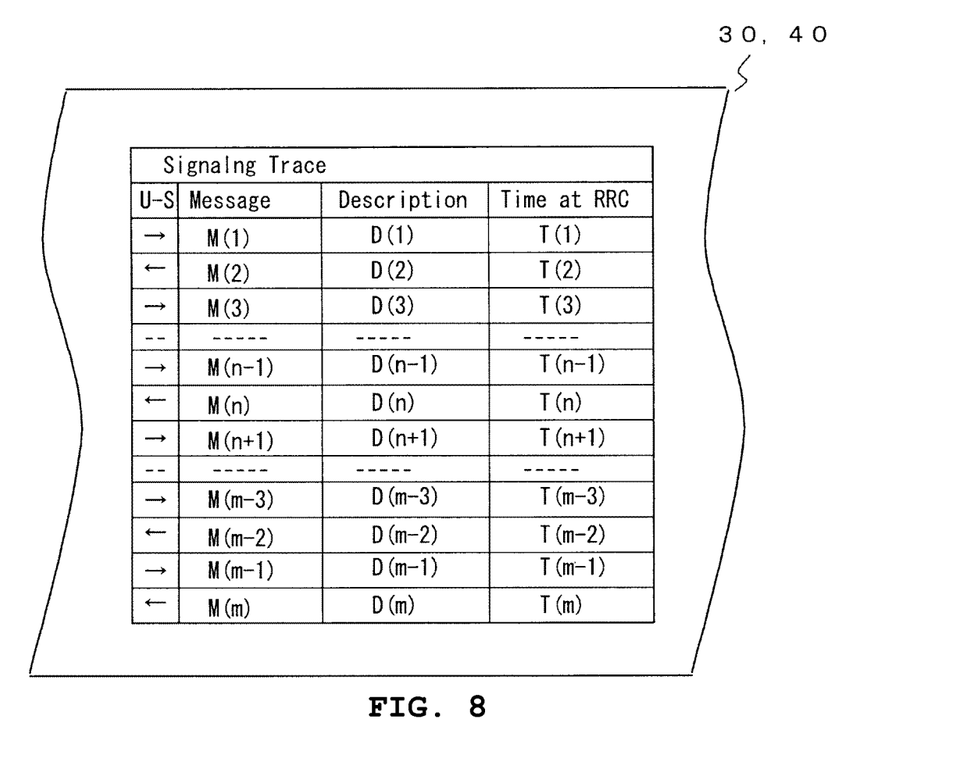
FIG. 8 is a diagram illustrating an example of the detailed measurement results of one measurement item related to the message.

For example, when the touch operation area E'(2,1) of the item name "Signaling Trace" is touched, detailed data in which all of the messages exchanged between the test device and the mobile terminal are arranged in time series is generated and displayed, as illustrated in FIG. 8.

When the touch operation area of the item name "Sequence Monitor" or the item name "UE Report" is touched, detailed information is also generated for each item and is then enlarged and displayed, instead of the measurement item list screen.

For example, it is preferable to use a method in which a mode switching tab key is provided on the measurement item list display screen and the operation mode switches between a measurement mode (first mode) related to the quality of the transmission signal from the mobile terminal 1 and a measurement mode (second mode) related to the reception and transmission of messages when the mode switching tab key is touched. However, the invention is not limited thereto. For example, any method, such as a switching method using the second operating unit 42, may be used.

DESCRIPTION OF REFERENCE NUMERALS AND SIGNS

1: MOBILE TERMINAL
20: MOBILE TERMINAL TEST DEVICE
21: MEASUREMENT UNIT
22: DATA GENERATION UNIT
23: TRANSMITTING UNIT
25: RECEIVING UNIT
26: DATA ANALYSIS UNIT
30: DISPLAY UNIT
40: OPERATING UNIT
41: FIRST OPERATING UNIT
42: SECOND OPERATING UNIT
50: CONTROL UNIT
51: MEASUREMENT ITEM LIST DISPLAY MEANS
52: VALIDATION/INVALIDATION DESIGNATION MEANS
53: SWITCHING BUTTON DISPLAY MEANS
54: BRIEF MEASUREMENT RESULT DISPLAY MEANS (IN-SECTION MEASUREMENT RESULT DISPLAY MEANS)
55: DETAILED MEASUREMENT RESULT DISPLAY MEANS (MEASUREMENT RESULT ENLARGEMENT AND DISPLAY MEANS)
56: THREE-DIMENSIONAL MEASUREMENT RESULT DISPLAY MEANS

What is claimed is:

1. A mobile terminal test device comprising:
a measurement unit that transmits and receives signals to and from a mobile terminal to be tested and measures a designated measurement item;
a display unit;
an operating unit that is used to designate the measurement item to be measured by the measurement unit; and
a control unit that instructs the measurement unit to measure the measurement item designated by the operating unit and displays measurement results of the designated measurement item on the display unit,
wherein the operating unit includes a touch-panel-type operating unit that is overlapped on a screen of the display unit, and
the control unit includes:
measurement item list display means for setting a plurality of touch operation areas allocated to a plurality of measurement items for the mobile terminal to be tested, which can be measured by the measurement unit, in the touch-panel-type operating unit and displaying a list of sections indicating the outer edges of the plurality of touch operation areas and measurement item names for the sections on the display unit;
validation/invalidation designation means for designating whether to validate or invalidate the execution of the measurement item whose name is displayed;
switching button display means for displaying, in the section of the touch operation area corresponding to the measurement item which has been invalidated by the validation/invalidation designation means, a switching button for switching the designated state of the measurement item from an invalid state to a valid state to inform that the measurement item has been invalidated; and
in-section measurement result display means for displaying the measurement results of the measurement item which has been validated by the validation/invalidation designation means and the measurement item whose designated state has been changed from the invalid state to the valid state by a touch operation for the switching button displayed by the switching button display means in the sections of the touch operation areas corresponding to the measurement items to inform that the measurement item has been validated.

2. The mobile terminal test device according to claim 1, further comprising:
measurement result enlargement and display means for, when the section of the touch operation area in which the measurement results are displayed by the in-section measurement result display means is touched, enlarging and displaying the measurement results, instead of the display of the list by the measurement item list display means.

3. The mobile terminal test device according to claim 2, wherein the measurement item list display means has a first mode in which a list of measurement items related to the quality of a transmission signal from the mobile terminal is displayed and a second mode in which a list of measurement items related to a message that is transmitted and received to and from the mobile terminal is displayed, the in-section measurement result display means displays the measurement results of any of the measurement items, which are displayed as a list in the first mode and the second mode, in each section, and the measurement result enlargement and display means enlarges and displays the measurement results, instead of the display of the list.

4. The mobile terminal test device according to claim 1, wherein the display of the list of the measurement items is a tile display in which the measurement items are arranged in a vertical direction and a horizontal direction.

5. The mobile terminal test device according to claim 1, wherein the switching button has a word "ON" displayed thereon and is displayed substantially at the center of the section.

6. The mobile terminal test device according to claim 1, wherein the control unit displays a start button in a portion of a display screen of the measurement results which are enlarged and displayed by the measurement result enlargement and display means, and when the start button is touched, the control unit instructs the measurement unit to measure the measurement item which is validated at the present time and updates the display on the basis of the measurement results obtained by the measurement unit.

* * * * *